United States Patent [19]
Taylor et al.

[11] Patent Number: 6,093,375
[45] Date of Patent: Jul. 25, 2000

[54] NUCLEAR FUEL REPROCESSING

[75] Inventors: Robin John Taylor; Iain Stewart Denniss; Andrew Lindsay Wallwork, all of Seascale, United Kingdom

[73] Assignee: British Nuclear Fuels PLC, Warrington, United Kingdom

[21] Appl. No.: 09/117,863

[22] PCT Filed: Feb. 14, 1997

[86] PCT No.: PCT/GB97/00416

§ 371 Date: Aug. 7, 1998

§ 102(e) Date: Aug. 7, 1998

[87] PCT Pub. No.: WO97/30456

PCT Pub. Date: Aug. 21, 1997

[30] Foreign Application Priority Data

Feb. 14, 1996 [GB] United Kingdom ............... 9603059

[51] Int. Cl.$^7$ ................................................... B01D 11/00
[52] U.S. Cl. ...................................... 423/8; 423/9; 423/10
[58] Field of Search ...................................... 423/8, 9, 10

[56] References Cited

U.S. PATENT DOCUMENTS 3,900,551  8/1975  Bardoncelli et al. .
4,229,421  10/1980 Chapman et al. .
4,659,551  4/1987  Kolarik et al. .

OTHER PUBLICATIONS

Nuclear Energy, vol. 26, No. 4, Aug. 1987, London, GB, pp. 253–258. V.A. Dracke: "Predicting the behavior of the neptunium during nuclear fuel reprocessing".

JOM, vol. 45, No. 2, Feb. 1993, Warrendale, US, pp. 35–39. Mac Toth et al.: "Aqueous and pyrochemical reprocessing of actinide fuels".

*Primary Examiner*—Tom Dunn
*Assistant Examiner*—Christina Ildebrando
*Attorney, Agent, or Firm*—Myers Bigel Sibley & Sajovec

[57] ABSTRACT

A spent fuel reprocessing method includes at least the formation of an aqueous solution and at least one solvent extraction step. Formohydroxarmic acid is used to reduce any Np(VI) to Np(V) and/or to form a complex with Np(IV). As a result, substantially all the neptunium present is retained in the aqueous phase during solvent extraction.

6 Claims, 6 Drawing Sheets

NUCLEAR FUEL REPROCESSING

This application is a 371 of PCT/GB97/00416 filed Feb. 14, 1997, based on UK 9603059.8, filed on Feb. 14, 1996.

This invention relates to nuclear fuel reprocessing and is particularly concerned with the control of neptunium in the reprocessing of spent fuel.

Reference will be made hereinafter to the use of the present invention in the Purex Process in an Advanced Reprocessing Plant (ARP). However, the present invention may have application in other processes for reprocessing spent fuel.

In Purex reprocessing, neptunium valency control can be a significant problem. Neptunium is present in the Purex process as a mixture of three different valence states Np(IV), (V) and (VI). Np(IV) and (VI) are both extractable into the solvent phase (tributyl phosphate (TBP) diluted in an inert hydrocarbon such as odourless kerosene (OK)) whereas Np(V) is inextractable into this phase. In order to direct Np to raffinate streams, Np has to be stabilised in the (V) oxidation state. This is a complex matter, since not only is it the middle oxidation state of three but Np(V) also undergoes competing reactions, such as disproportionation to Np(IV) and (VI) and is oxidised to Np(VI) by nitric acid. Neptunium control is therefore difficult and efficient neptunium control is a major aim of an advanced reprocessing programme.

After fuel dissolution, Np is likely to be present as a mixture of all three oxidation states. Np(V) will be separated with the aqueous phase at an earlier stage. Np(IV) and (VI) will follow the solvent (containing uranium and plutonium) into the so-called U/Pu split. In the U/Pu split, Np is reduced by U(IV) to Np(IV) which follows the uranium stream into the solvent product. Np is then separated from uranium during the uranium purification clyde. Np(IV) is converted to Np(V) and Np(VI) by heating in the aqueous phase in a conditioner at a high temperature. The conditioned liquor is fed to an extract and scrub mixer-settler where the Np(IV) is rejected to the aqueous raffinate. Any Np(VI) present in the aqueous feed is reduced to Np(V) by hydroxylarmine which is fed to the scrub section of the contactor. In a typical process, two or three mixer-settlers are required to decontaminate the uranium product from Np.

It has now been surprisingly discovered that formohydroxarnic acid (FHA) may be used to control neptunium in spent fuel reprocessing. According to the present invention there is provided a spent fuel reprocessing method which includes at least the formation of an aqueous solution and at least one solvent extraction step, characterised in that formohydroxamic acid is used to reduce any Np(VI) to Np(V) and/or to form a complex with Np(IV) whereby substantially all the neptunium present will be retained in the aqueous phase during solvent extraction.

A particularly useful property of FHA in the context of the present invention is that it is easily destroyed either by acid hydrolysis to formic acid and hydroxylamine or by nitric acid to component gases. Therefore the Np can be recovered from the FHA solution and the destruction of FHA will reduce radioactive liquid waste volumes.

The kinetics of the hydrolysis of FHA have been determined. In $HNO_3$ the rate of reaction is:

$$-\frac{d[\text{FHA}]}{dt} = k[\text{FHA}][\text{H}^+]$$

where $k=2.54\times10^{-4}$ $dm^3mol^{-1}s^{-1}$ and the energy of activation $E_{ACT}$ is 77.3±1.6 kJ/mol The hydrolysis of FHA is a potential problem in solvent extraction contactors which have long residence times such as mixer-settlers or pulsed columns. However an Advanced Reprocessing plant designed to use FHA would use centrifugal contactors which themselves offer significant advantages over pulsed columns, mixer-settlers and other solvent extraction contactors. These centrifugal contactors have very low residence times. The kinetics of FHA hydrolysis prove that hydrolysis will not be a problem in a plant using centrifugal contactors and this easy decomposition of FHA offers other significant advantages.

In order to maximise the concentration of FHA introduced in to the contactor and so to allow the most efficient flowsheet operation, crystalline FHA should initially be dissolved in water only as FHA is effectively stable in water. If the strip solution containing FHA needs to contain nitric acid as well as FHA then the neutral FHA solution and the acid solution should be mixed immediately prior to introduction to the contactor, thereby minimise acid hydrolysis of FHA.

In one embodiment of the present invention, Np is directed with the Pu product in the U/Pu split. In this embodiment, Np(V) remains in the aqueous phase. Any Np(VI) present is reduced to Np(V) by FHA and is also directed to the Pu product. Using FHA, Np(IV) present can be rendered inextractable by formation of the Np(IV)-FHA complex so that it is retained in the aqueous phase and directed to the Pu product stream. Pu as Pu(IV) is also complexed by FHA and accordingly FHA can be used as a single reagent which will separate Pu and Np completely from uranium.

Figure 1:
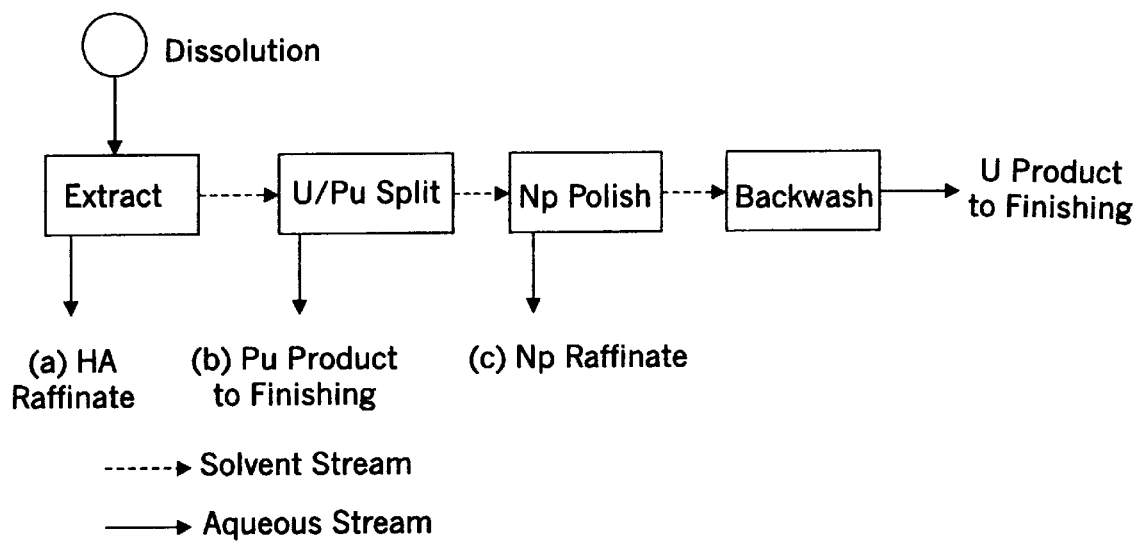
FIG. 1 is a flowsheet for second embodiment of the invention.
Figure 2:
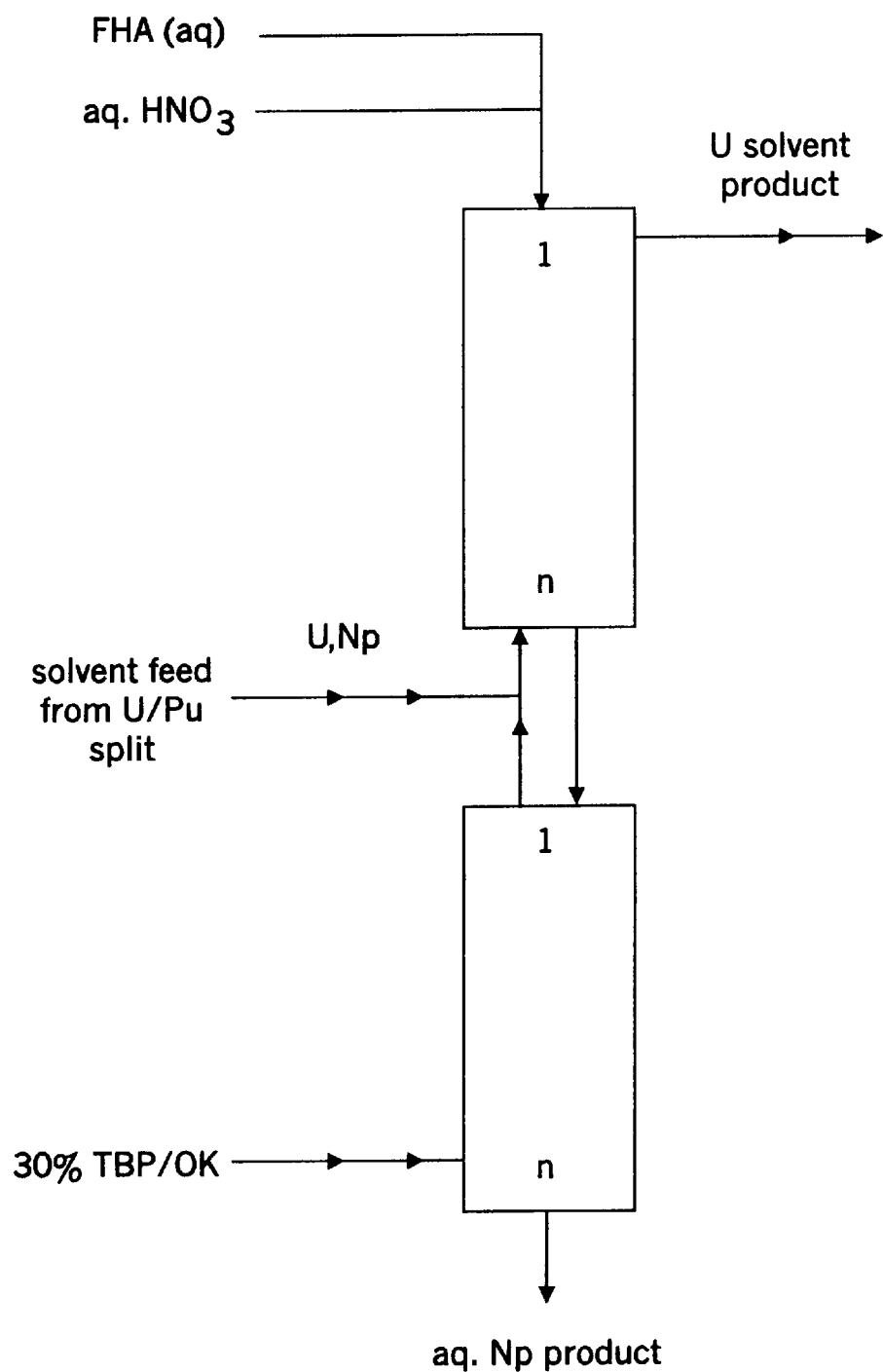
FIG. 2 illustrates the Np Polish contactor.

In a second embodiment in accordance with the present invention, Np is removed from the uranium product solvent stream in a "Neptunium Polish" contactor using FHA as a complexant for Np(IV) and a reductant for Np(VI). This gives a relatively pure Np-237 stream which can be disposed of independently if desired. Any residual Pu(IV) in this contactor will also be removed by complexation with FHA. FIG. 1 of the accompanying drawings is a flow sheet for this embodiment of the present invention. FIG. 2 of the accompanying drawings illustrates the Np Polish contactor in greater detail. In this drawing n is the number of centrifugal contactor stages. Solvent flows and reagent concentrations are not specified. Generally, the contactor is operated at room temperature to minimise FHA hydrolysis, but this is not an essential requirement.

In either of the above-mentioned embodiments, the aqueous stream containing Np and FHA can be reduced in volume quite easily by decomposition of FHA and Np-FHA complexes, either by boiling in strong nitric acid or by addition of nitrous acid.

Figure 3:
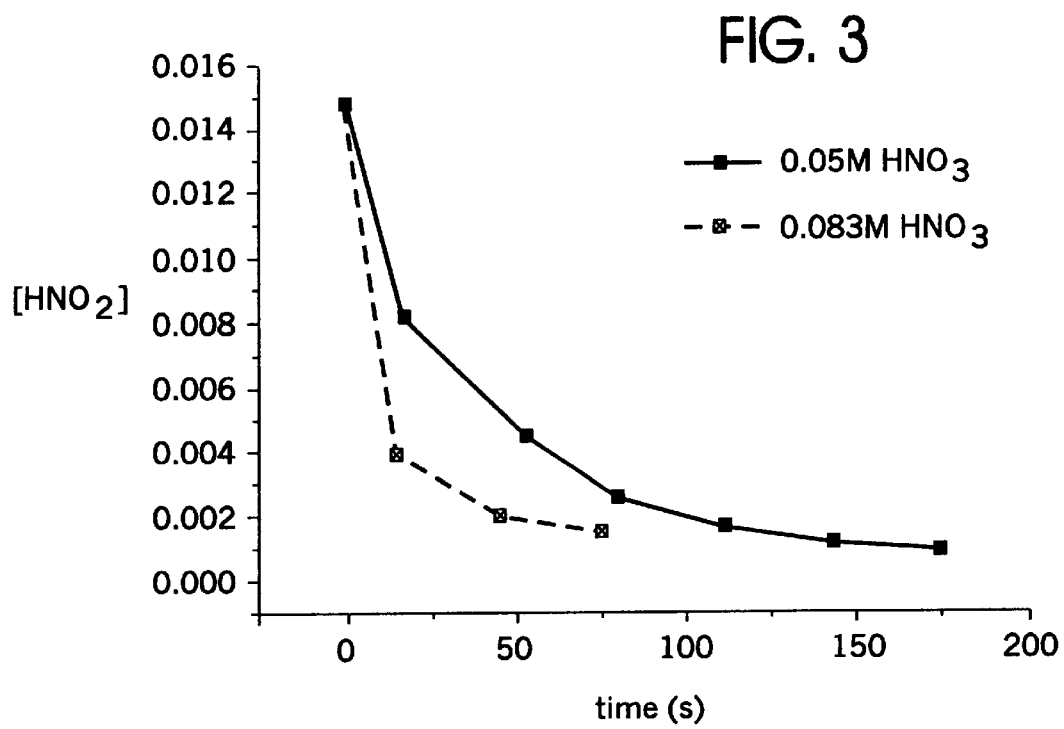
FIG. 3 is a graph of [HNO2] vs. time.

Accordingly, total neptunium control can be achieved by the method of the present invention with the use of only a single reagent. Particular advantages of a process in accordance with the present invention are as follows:

1) A single solvent extraction cycle is sufficient to produce separate U, Np and Pu products. This is a major advantage over current reprocessing plants which generally use three solvent extraction cycles.
2) No uranium purification solvent extraction cycle (or conditioners) are required; only a single strip (Neptunium Polish) contactor is required.
3) The use of the Neptunium Polish contactor produces high purity separated products whilst maintaining a single cycle procedure.
4) The neptunium can be routed to a single stream thereby making waste disposal easier.
5) FHA can be used with centrifugal contactors despite hydrolysis of FHA taking place since the residence times in the centrifugal contactors are low.
6) No separation of neptunium (or plutonium) from FHA is needed, since FHA can be easily decomposed to gases.
7) A single reagent is utilised to deal effectively with both Np(IV) and Np(VI), making use of both the complexant properties of FHA and also its reducing properties.
8) FHA quickly reacts with $HNO_2$ and so can be used to scavenge $HNO_2$ in the process. This is important since $HNO_2$ catalyses $HNO_3$ oxidation reactions of actinides and specific antinitrites such as hydrazine are often required in current processes. FIG. 3 of the accompanying drawings shows that this reaction is fast even at very low acidities. At typical acidities used in the process (eg 1M $HNO_3$) the timescales of this reaction are compatible with centrifuigal contactor residence times.

Figure 5:
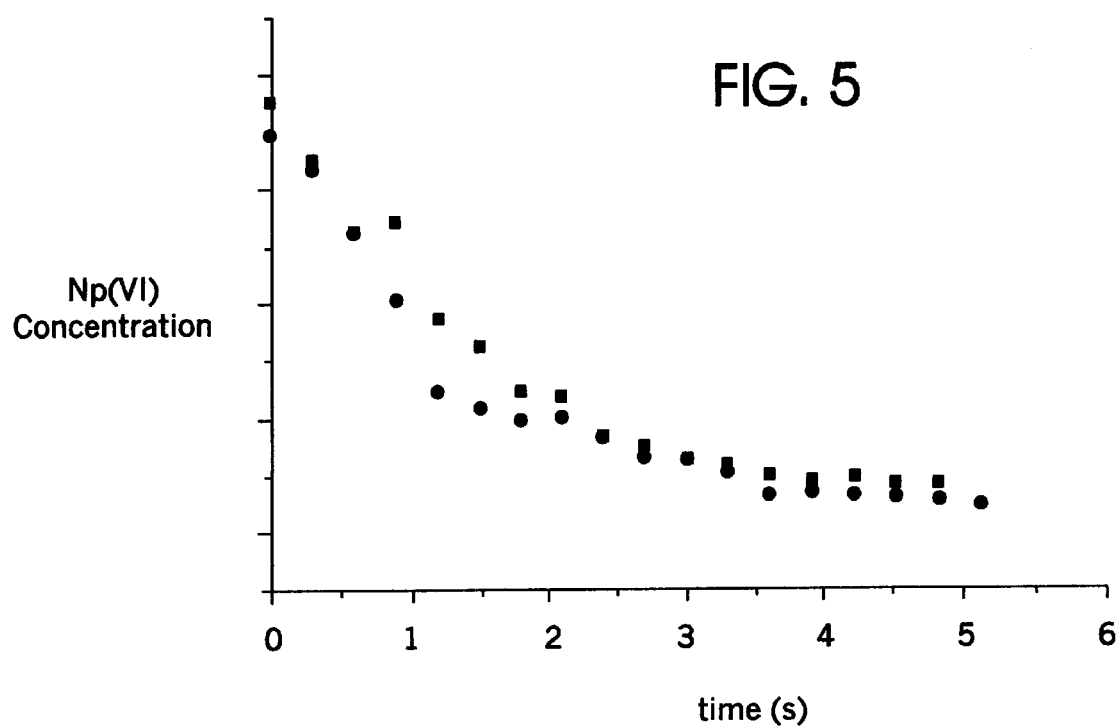
FIG. 5 is a graph of Np(VI) concentration vs. time after the addition of excess FHA.
Figure 4:
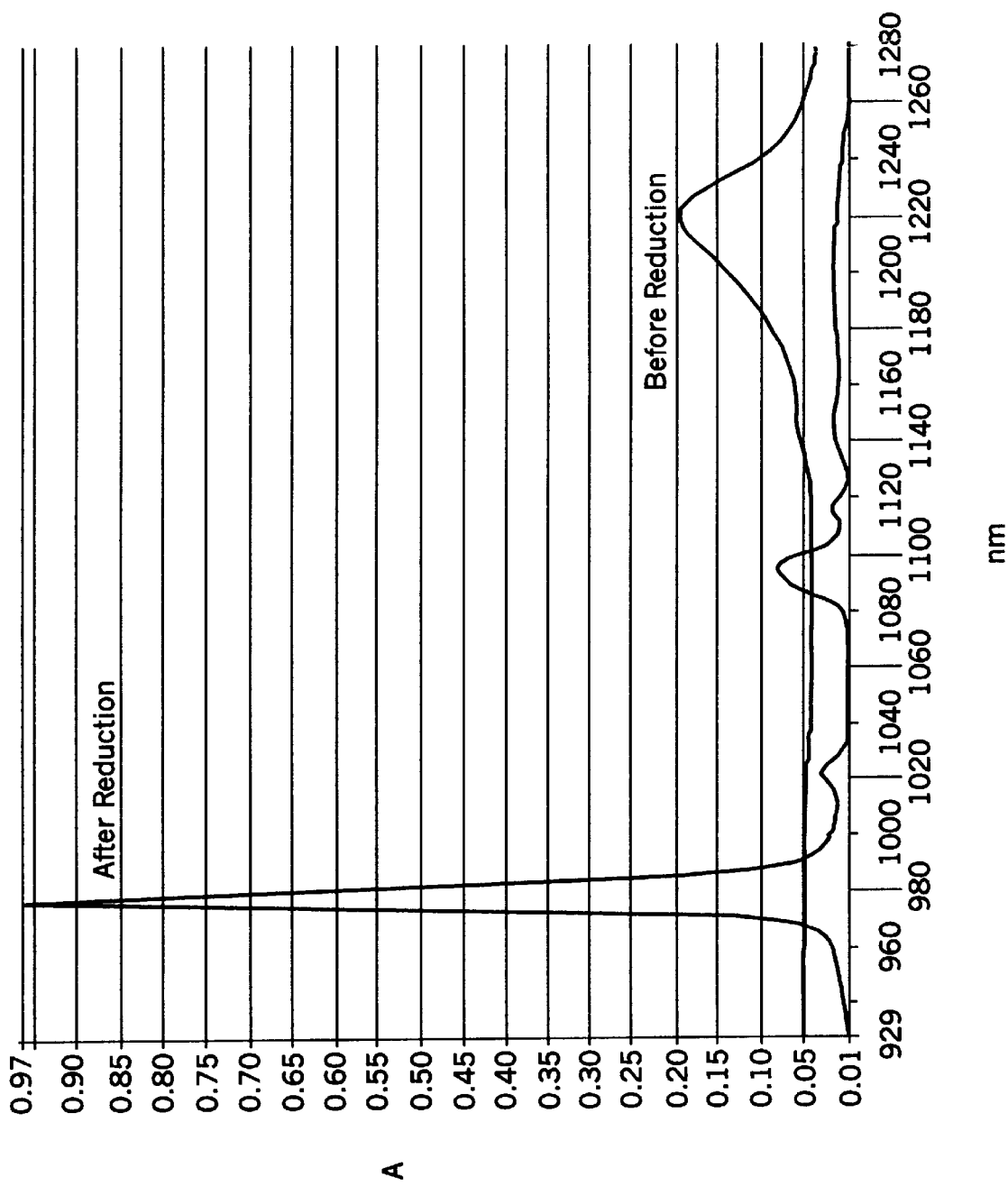
FIG. 4 is the absorption spectra between 920 and 1280 nm before and after addition of FHA solution in 1.7M nitric acid.

Experiments have been conducted to examine the reduction of Np(VI) and complexation of Np(IV) by FHA using spectroscopic and radiometric techniques. FIG. 4 of the accompanying drawings shows the absorption spectra between 920 and 1280 nm before and after the addition of FHA solution in 1.7M nitric acid. Complete reduction of approximately 0.004M Np(VI) (identified by absorption peak at 1223 nm) to Np(V) (980 nm peak) is apparent. Complete reduction is rapid and is estimated to be of a similar order to the mixing times in a centrifugal contactor stage at room temperature and in 1–2M nitric acid, that is to say, less than about ten seconds. FIG. 5 of the accompanying drawings shows the decrease in Np(VI) concentration with time after the addition of excess FHA. The results of two identical reactions in 1.78M $HNO_3$ are given. Complete reduction of Np(VI) is achieved in about 4 seconds. Similar results are obtained at other acidities between 0.5 and 3M $HNO_3$. Therefore FHA is a very fast, new salt free selective reducing agent for Np(VI) suitable for use in intensified centrifugal contactors thereby offering significant advantages over conventional processes.

Figure 6:
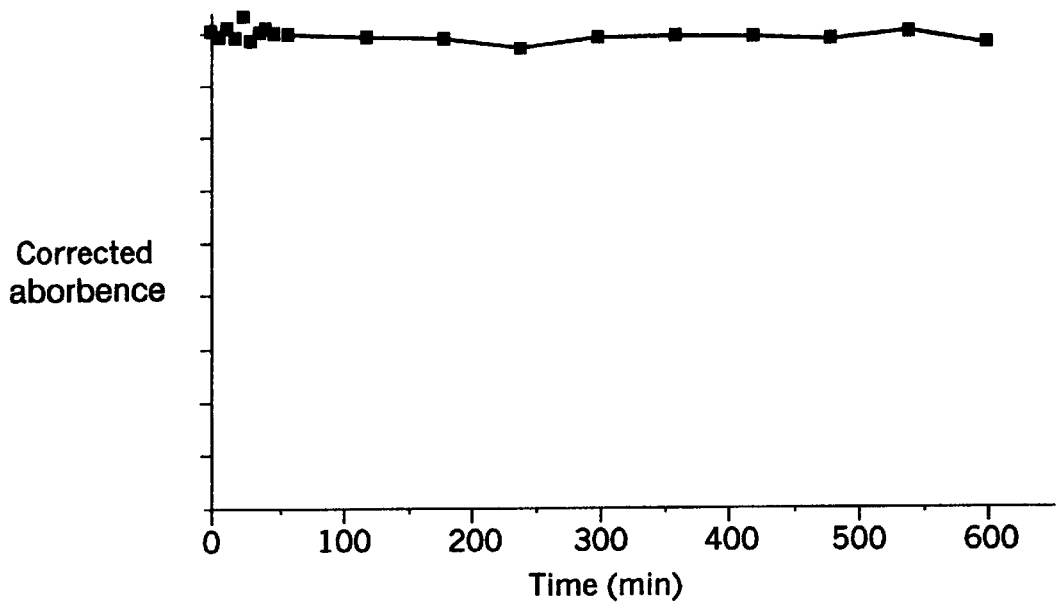
FIG. 6 illustrates graphically the reaction between Np(V) and FHA at room temperature in a solution containing 1.7M HNO3 and 0.333M FHA.

Further experiments have confirmed that reduction of Np (V) to Np (IV) does not effectively take place since the rate of FHA destruction by hydrolysis is faster than the rate of Np(V) reduction. FIG. 6 of the accompanying drawings illustrates graphically the reaction between Np(V) and FHA at room temperature in a solution containing 1.7M $HNO_3$ and 0.333M FHA. The graph plots a corrected absorbence at 980 mn (directly proportional to [Np(V)]) vs. time. There is no change in Np(V) concentration over a period of 10 h at room temperature.

The hydrolysis product of FHA is hydroxylamine which is a very slow reductant for Np(V); the rate constant t(K) of this reaction is $K=4.54\times10^{-2}M^{-2.65}$ $min^{-1}$ at 92° C. (V S Koltnov and M F Tikhonov, Radiokhimiya 19(5), 620–625, 1977). Accordingly, Np(V) is effectively stable in centrifugal contactors due to their short residence times.

Further experiments have shown that a similar reaction occurs in the presence of U but without reducing U(VI). Scoping experiments in 1.9M nitric acid in the presence of 100× excess U showed that Np(VI) was reduced to Np(V) as before. Following solvent extraction with 30% TBP/OK (1:1 ratio for 15 mins), analysis of total Np and U concentrations in each phase showed that the distribution values of 3.26 for U and 0.035 for Np were as expected for U(VI) and Np(V), thus confirming the spectroscopic results.

It has also been shown that if a solvent phase solution of Np(VI) and U(VI) is contacted with excess reductant in 1.9M nitric acid, the Np is reduced to inextractable Np(V) and stripped to the aqueous phase. U remained in the solvent phase. Np and U concentrations in both phases were determined radiometrically and distribution values were calculated to be 0.042 for Np and 4.26 for U. The distribution values are similar to those when only the aqueous phase is present and are consistent with literature data for Np(V) and U(VI), thus indicating that the aqueous phase reductant strips Np(VI) from the solvent phase in to the aqueous raffinate as Np(V) whilst leaving U(VI) in the solvent product.

Figure 7:
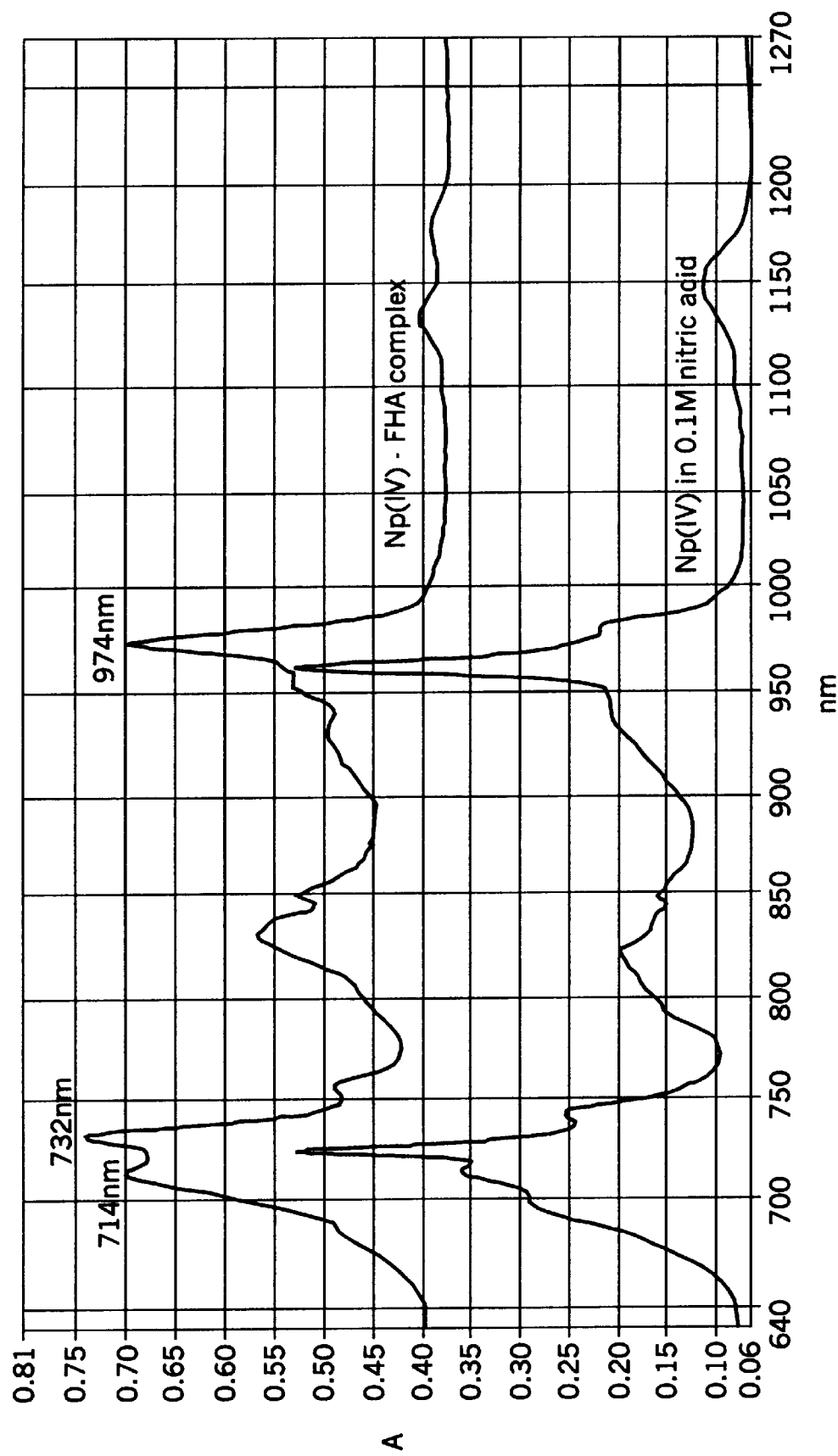
FIG. 7 is the near infra-red spectrum of the Np(IV)-FHA complex and Np(V) in 0.1 M nitric acid.

The complexation of Np(IV) by FHA has been investigated by near infra-red spectroscopy. FHA complexes neptunium in dilute nitric acid and yields a distinctive 'fingerprint' spectrum with major peaks at 714 and 732 nm (see FIG. 7 of the accompanying drawings) which shows the near infra-red spectrum of the Np(IV)FHA complex and of Np(IV) in 0. 1M nitric acid. These characteristic spectra have been used to monitor the effect of nitric acid on the FHA-Np(IV) complex. As expected, complex formation is inhibited by increased nitric acid concentration and the complexation process can be reversed by the addition of concentrated nitric acid. Near infra-red spectroscopy has also been used to monitor the stripping of Np(IV) from 30% TBP/OK into nitric acid solutions of FHA.

Figure 8:
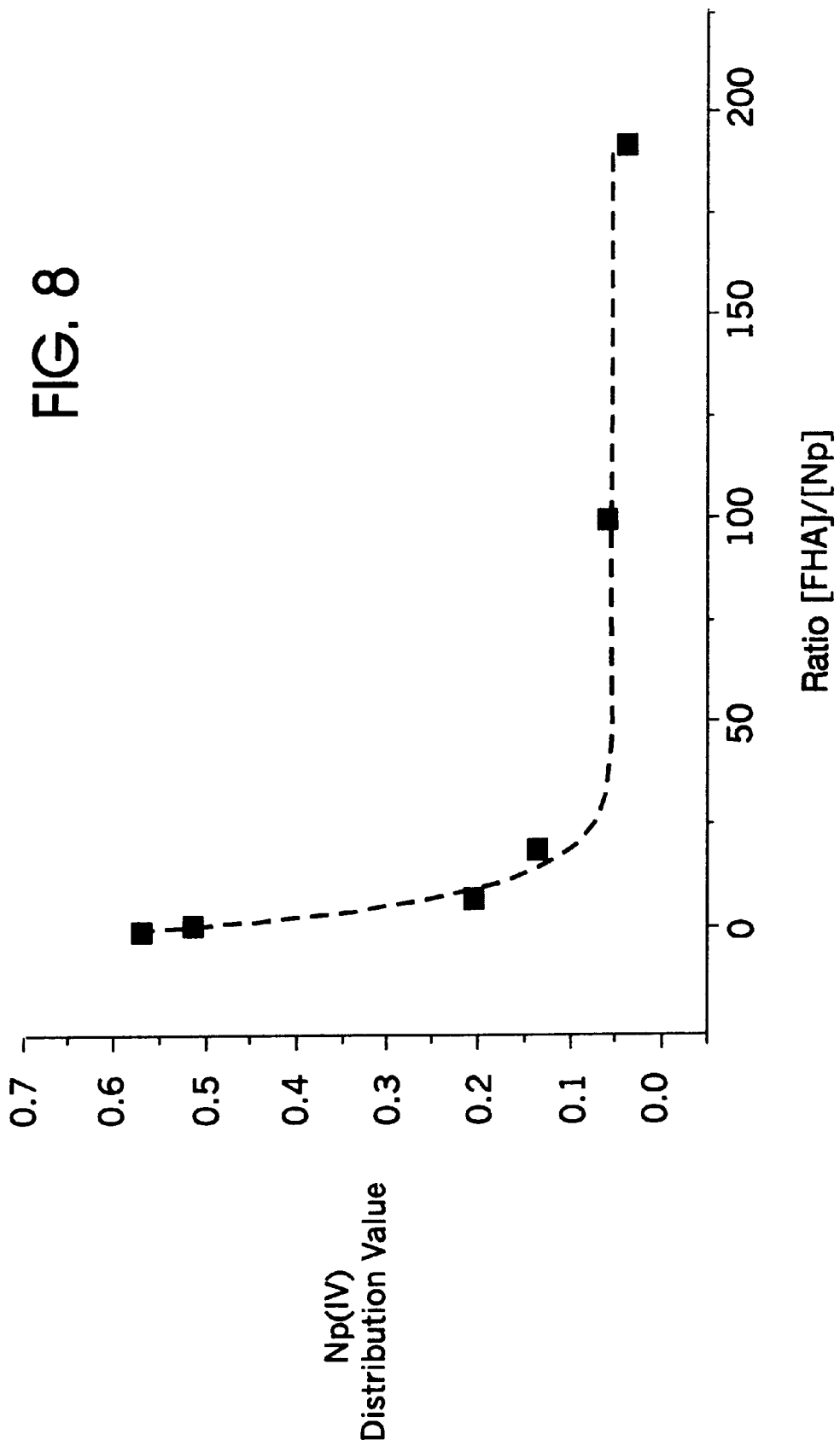
FIG. 8 shows the effect of increasing FHA concentration on the Np(IV) distribution value in 1M HNO3.

Experimental data and predictive computer modelling have been used to assess the stripping capability of formohydroxamic acid. Results show that the Np(IV)-formohydroxamate complex is inextractable into 30% TBP/OK and the distribution value decreases significantly at lower acidity and higher ligand concentration. FIG. 8 of the accompanying drawings shows the effect of increasing FHA concentration on the Np(IV) distribution value in 1M $HNO_3$, the total Np concentration being about 0.005M.

We claim:

1. In a spent fuel reprocessing method comprising at least the formation of an aqueous solution of the spent fuel and at least one solvent extraction step, the improvement comprising a step of using formohydroxamic acid to reduce any Np(VI) to Np(V) and/or to form a complex with any Np(IV) whereby substantially all the neptunium present will be retained in an aqueous phase during the solvent extraction step.

2. A method according to claim 1 in which the spent fuel contains both uranium and plutonium and the uranium is extracted in the solvent extraction step.

3. A method according to claim 1 or claim 2 in which neptunium is separated from the uranium in the same step as the separation of the uranium from the plutonium.

4. A method according to claim 1 or claim 2 in which the plutonium is first separated from the uranium and the neptunium is separated from the uranium in a subsequent step.

5. A method according to claim 1 in which the formohydroxamic acid is removed by boiling in strong nitric acid or by addition of nitrous acid.

6. A method according to claim 1 in which at least one centrifugal contactor is used.

* * * * *